United States Patent [19]

Walsh

[11] 3,761,907

[45] Sept. 25, 1973

[54] WARNING SIGNAL MULTIPLEXER CIRCUIT

[75] Inventor: Cyral M. Walsh, Sherman Oaks, Calif.

[73] Assignee: Lear Siegler, Inc., Santa Monica, Calif.

[22] Filed: Aug. 3, 1972

[21] Appl. No.: 277,645

[52] U.S. Cl. .............. 340/213 R, 328/114, 328/132

[51] Int. Cl. ......................... H03k 5/00, G08b 23/00

[58] Field of Search ..................... 340/248 D, 213 R, 340/172, 147 CN; 328/114, 132; 307/211, 235

[56] References Cited

UNITED STATES PATENTS

| | | | |
|---|---|---|---|
| 3,588,857 | 6/1971 | Gessner | 340/213 R |
| 3,588,530 | 6/1971 | Langan | 307/235 X |
| 3,579,120 | 5/1971 | Curran | 307/211 X |
| 3,539,928 | 11/1970 | Gardner et al. | 340/147 CN |
| 3,059,228 | 10/1962 | Beck et al. | 340/147 CN |

*Primary Examiner*—Donald J. Yusko
*Attorney*—Harold L. Jackson et al.

[57] ABSTRACT

A multiplexer circuit monitors the state of several input signals and provides output control signals indicative of any change of state of the input signals. Input terminals are coupled to apply the respective input signals to be monitored to a summing circuit which provides a sum signal having a voltage level indicative of the collective state of the monitored signals. A voltage-to-time increment converter circuit operates to provide an enabling pulse having a selected width in response to certain changes in the voltage level of the sum signal. The enabling pulse provided by the converter circuit is applied to operate a gating circuit to provide desired output control signals.

11 Claims, 12 Drawing Figures

WARNING SIGNAL MULTIPLEXER CIRCUIT

BACKGROUND OF THE INVENTION

1. Field of the Invention

This invention generally relates to an analog circuit for monitoring the state of several signals. More specifically, the present invention concerns a multiplexer circuit by which an output control signal is provided for a preselected time to indicate that the state of at least one of the monitored signals has changed in a direction of interest.

2. Description of the Prior Art

The monitoring of signals in an electrical system is frequently required for a variety of purposes. The variety of meters or warning lights found on the dashboard of an automobile and which serve to indicate certain conditions of the automobile are exemplary of such signal monitoring. An analogous requirement exists in conjunction with aircraft control systems wherein numerous aircraft conditions are being continually sensed. A computing device may be used to provide signals to control the aircraft during flight or take-off and/or landing and it may be important to have a warning or indication when there is a malfunction embodied by certain computer inputs being missing or inoperative.

Typically, the number of different conditions that are monitored with respect to the aircraft and its control system may be represented by signals having two binary levels. A system designed to monitor these many signals may then be required to simply sense the state, or change of state, of the respective signals and provide a control signal of a desired type whenever the state of a monitored signal changes.

Prior art circuitry that has been used to perform the above-described function has involved the use of a monitoring circuit for each of the signals being monitored. Typically, this may involve redundant wiring extending from the source of the signals being monitored to the location where the monitoring is to occur.

It has been found that the prior art monitoring arrangements and circuits however simple, or sophisticated, for the most part involve a complex scheme that involves significant amounts of extraneous and duplicative wiring and circuitry. In instances where such monitoring equipment is used aboard an aircraft, the sheer weight and volume of the redundant circuitry and wiring, in terms of dollars, is excessively costly and to that extent undesirable.

It is accordingly the intention of this invention to provide a simple analog circuit that serves to readily sense the change of state of any of several signals being monitored and which will provide an output control pulse responsive to any detected change of state wherein the output control pulses are suitable for activating or energizing a warning light or other utilization device for a prescribed length of time.

SUMMARY OF THE INVENTION

Briefly described, the present invention involves a multiplexer circuit that is useful fo monitoring the state of each of many bi-state signals and for providing an output control pulse having a prescribed pulse width whenever the state of any monitored signal is changed in a direction of interest.

More particularly, the subject multiplexer circuit includes a summing circuit, a voltage-to-time increment converter circuit, and an output gating circuit. The summing circuit operates to receive each of the input signals to be monitored and provide a sum signal representative of the cumulative state of all input signals applied thereto. The converter circuit operates to provide an enabling pulse to the output gating circuit whenever the signal provided from the summing circuit is changed in a direction of interest, i.e., increase and/or decrease. The gating circuit is enabled for a length of time corresponding to the width of the pulse from the converter circuit. The signals provided by the output gating circuit are readily useable for energizing or activating an appropriate utilization device.

The objects and many attendant advantages of the invention will be more readily appreciated as the same becomes better understood by reference to the following detailed description which is to be considered in connection with the accompanying drawings wherein like reference symbols designate like parts throughout the figures thereof.

Figure 1:
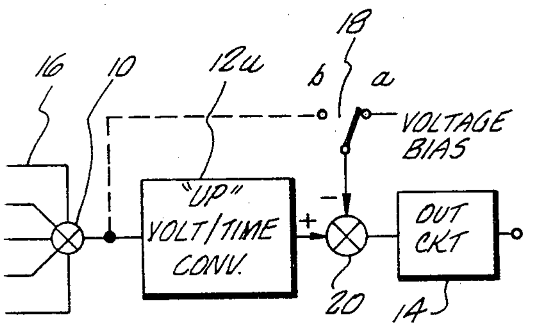
FIG. 1 is a schematic block diagram illustrating a first embodiment of the subject invention.
Figure 2:
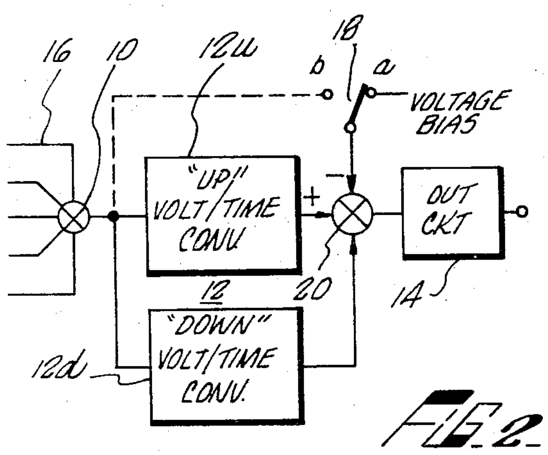
FIG. 2 is a schematic block diagram illustrating another embodiment of the subject invention.
Figure 3:
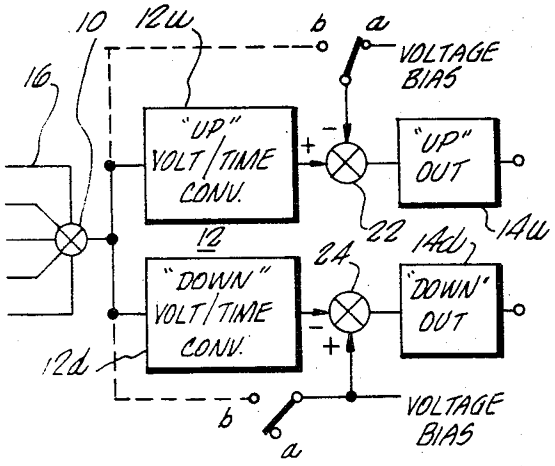
FIG. 3 is a schematic block diagram illustrating yet another embodiment of the subject invention.

FIGS. **5-1*a*, 5-1*b*, 5-2*a*, 5-2*b*, 5-3*a*, and 5-3*b* include a series of graphic diagrams that are useful in understanding the operation of the embodiments illustrated by FIGS. 1, 2 and 3**.

Figure 6:
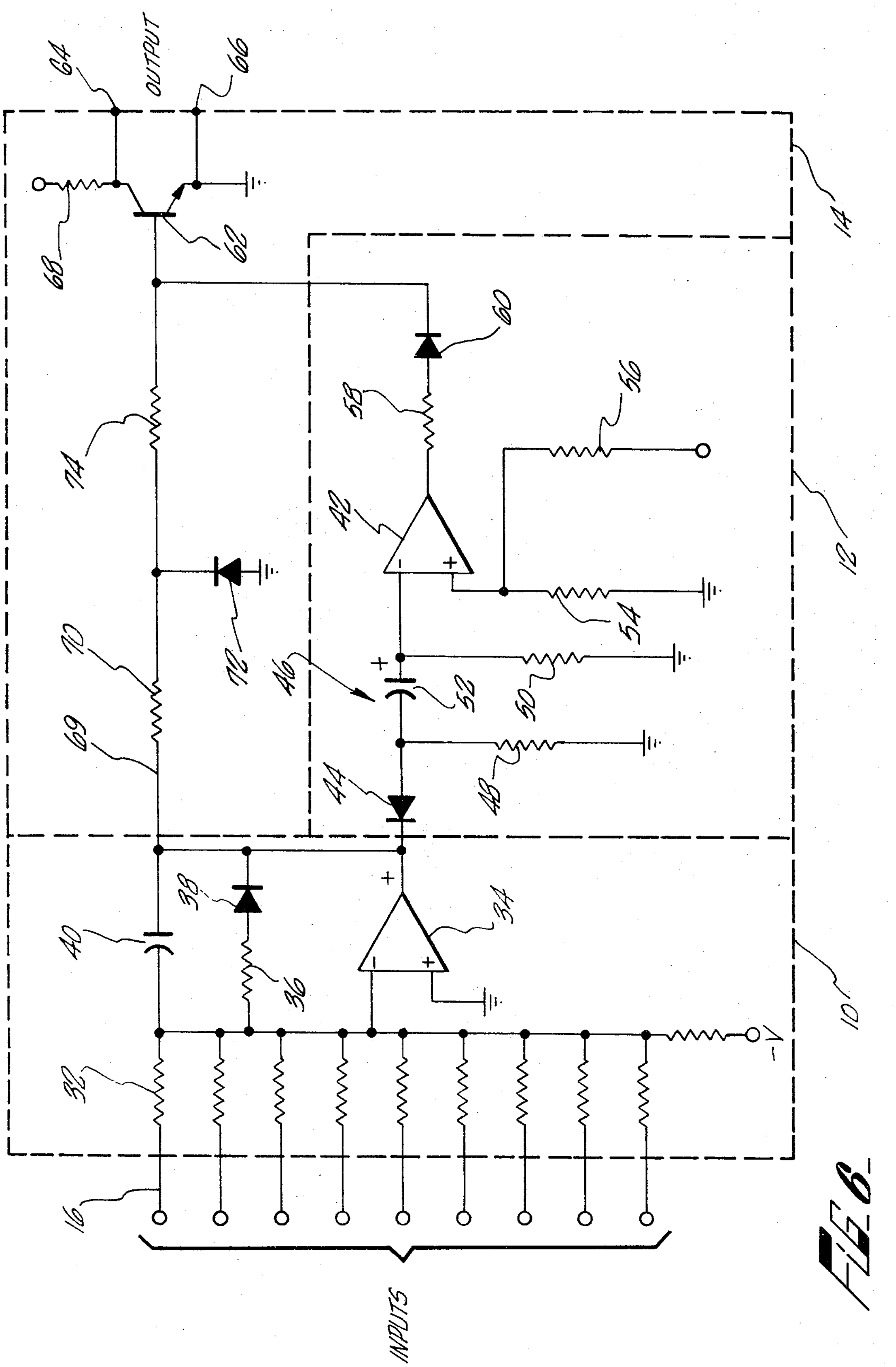

FIG. 6 is a detailed schematic diagram illustrating a multiplexer circuit in accordance with the subject invention.

Figure 7:
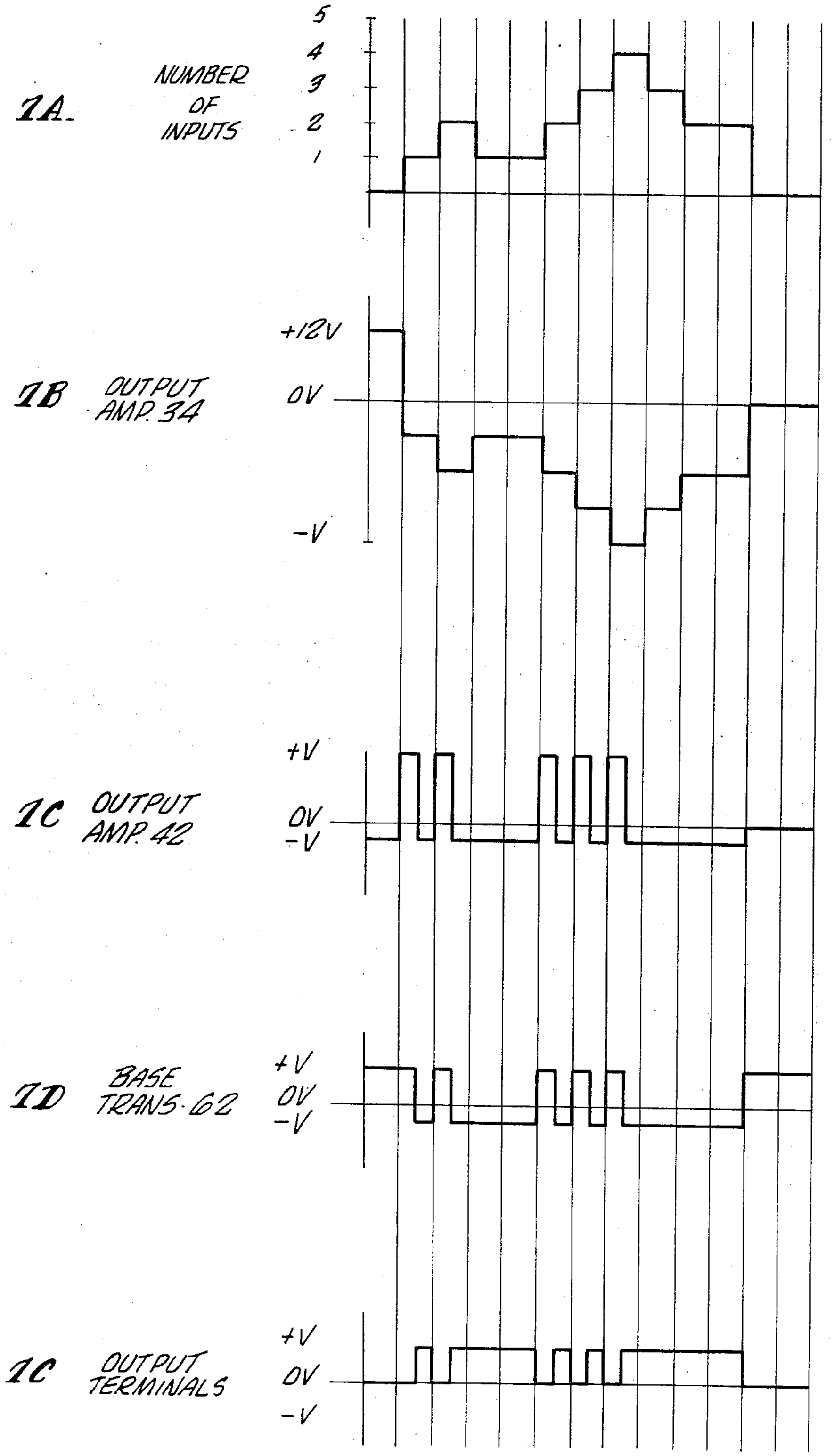

FIG. 7 is a series of waveforms that are useful in understanding the operation of the subject invention.

DESCRIPTION OF THE PREFERRED EMBODIMENT

Preferred embodiments of the subject invention are illustrated by FIGS. 1, 2 and 3. Each of the several embodiments basically includes a summing circuit 10, a converter circuit 12, and an output gating circuit 14. The summing circuit 10 serves to receive bistate input signals to be monitored over a plurality of input terminals 16 and provide a sum signal that cumulatively represents the state of the monitored signals. The converter circuit 12 provides an enabling pulse in response to selected changes in the level of the sum signal and hence in response to changes in the state of the monitored signals. The output gating circuit 14 serves to permit conditioning of the enabling pulses, i.e., adjusting voltage levels, polarity, etc., from the converter circuit 12 for use with any desired utilization device such as lights, buzzers, meters, switches, etc.

FIG. 1 illustrates a first embodiment wherein a plurality of monitored signals are applied via the input terminals 16 to the summing circuit 10. The monitored signals are understood to be bistate signals, i.e., having distinguishable high and/or low voltage levels. For the purposes of this discussion it may be assumed that a low voltage level is a normal state and that a high voltage level is abnormal and indicative of a malfunction of interest. Accordingly, the changes that are sought to be detected by the subject invention would be the existence of abnormal high level signals appearing at one or more of the input terminals 12.

The embodiment of FIG. 1 is designed to sense increases in the number of inputs that are at the abnormal high level. The waveform of FIG. 4 graphically illustrates the cumulative effect of various increases and decreases in the number of monitored signals at a high voltage level. For example, at time $t_0$ all monitored signals are at the normal low level. However, at time $t_1$ a single signal is changed from a low state to a high state and at time $t_2$ a second of the five monitored signals is shown to have assumed a high level. At time $t_3$ one of the two abnormal high level signals has reverted to a normal low level leaving one high level signal. A summary of the changes and cumulative number of abnormal signals among the five monitored signals that is graphically illustrated by FIG. 4 is summarized in Table I hereinbelow:

TABLE I

| Time | Number of High State Signals | Change |
|---|---|---|
| $t_0$ | 0 | — |
| $t_1$ | 1 | increase |
| $t_2$ | 2 | increase |
| $t_3$ | 2 | decrease |
| $t_4$ | 2 | increase |
| $t_5$ | 3 | increase |
| $t_6$ | 4 | increase |
| $t_7$ | 3 | decrease |
| $t_8$ | 2 | decrease |
| $t_9$ | 0 | decrease |

Figure 4:
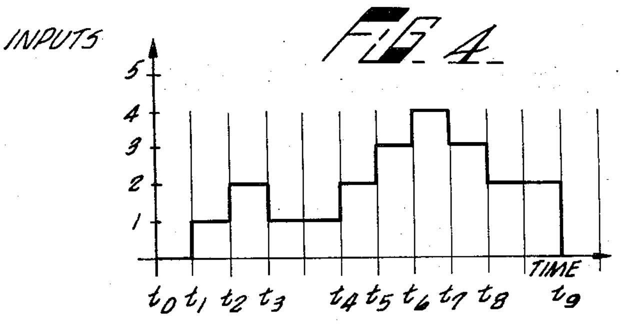
FIG. 4 is a graphic diagram illustrating an exemplary cumulative input signal that may be applied to the multiple input terminals of the circuits shown in FIGS. 1, 2 and 3.

As may be observed from FIG. 4 and Table I, the number of monitored signals at high levels is increased at times $t_1$, $t_2$, $t_4$, $t_5$, and $t_6$. It is noted that the waveform of FIG. 4 is submitted for exemplary purposes only and shows the incidence of a far greater number, and density, of malfunctions than ordinarily would occur.

Figure 5:
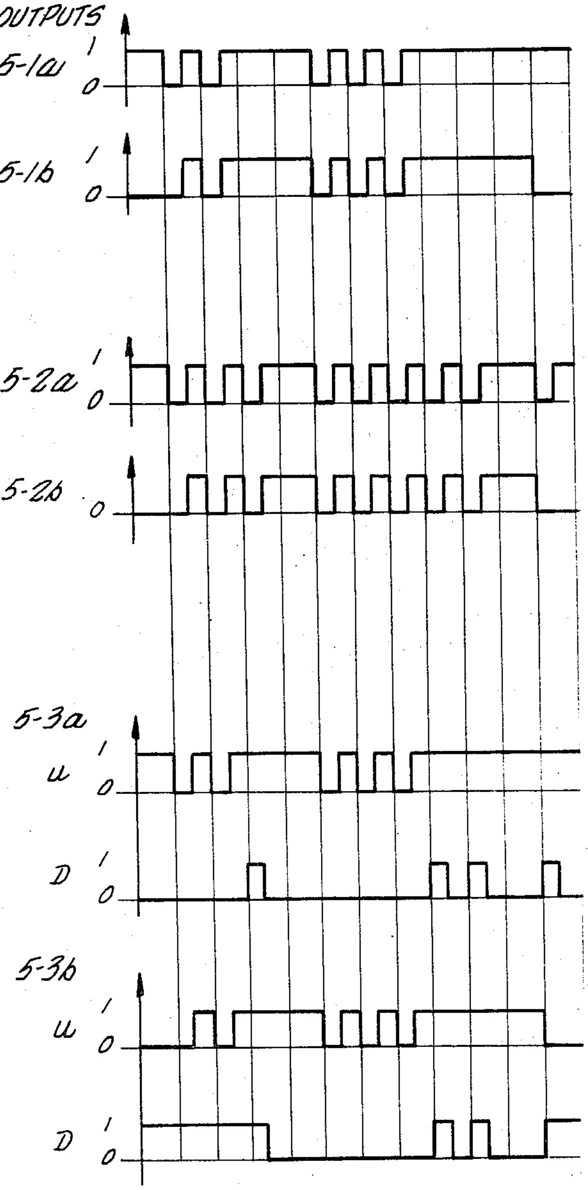

Referring once again to FIG. 1, the converter circuit 12 may be adapted to sense only the increases or "up-going" changes. Unique output signals would thus be provided by the output gating circuit 14 only at times $t_1$, $t_2$, $t_4$, $t_5$ and $t_6$. The waveform of FIG. 5-1*a* illustrates a plurality of negative pulses provided at such times. No pulses are provided for the decreases in the number of monitored signals at the abnormal high levels. Notably, the output pulses of the waveform of FIG. 5-1*a* only indicate the occurrence of an increase in number of abnormal signals. For example, there is no distinctive output signal condition that indicates that all signals are normal. Nevertheless, such an output may be desired and may be provided. The waveform of FIG. 5-1*a* is provided by applying a positive bias voltage to a summing junction 20 to have the output of the gating circuit maintained at a high level even when none of the monitored signals are at a high level.

The waveform of FIG. 5-1*b* shows an alternate output waveform that provides additional information, and thus would be ordinarily more useful, by being maintained at a zero level when all monitored signals are normal and maintained at a high level when any of the monitored signals are abnormal, pulses being provided when an "up-going" change occurs. A switching device 18 may be used to disconnect the bias voltage and complete an alternate signal path to provide the alternate waveform. Such an arrangement is discussed in greater detail hereinafter.

FIG. 2 illustrates how a pair of converter circuits 12*u* and 12*d* may be connected in parallel to sense both increases and decreases in the number of abnormal monitored signals. The output signals of the converter circuits 12*u* and 12*d* may be both connected to the summing junction 20 to operate the output gating circuit 14 and thereby provide a unique output pulse for any change in state of the input signals being monitored.

The modes of operation provided by the contact switch 18 may be used as above described to provide the waveforms of FIGS. 5-2*a* and 5-2*b* which correspond to the outputs produced by the output gating circuit 14 when the switch 18 is at the alternate positions thereof.

The embodiment of FIG. 3 illustrates how each of the converter circuits 12*u* and 12*d* may be provided with a separate output gating circuit 14*u* and 14*d* to generate separate output signals for increases and decreases. The waveforms *u* and *d* of FIG. 5-3*a* show a pair of output signals that would be provided by the output gating circuits 14*u* and 14*d* when a positive bias voltage is applied to each of the summing junctions 22 and 24. The two waveforms *u* and *d* of FIG. 5-3*b* illustrates the output signals that would be provided by the respective output gating circuits 14*u* and 14*d* when the alternate mode is employed. The waveforms d which correspond to decreases in the number of abnormal monitored signals has been inverted. Such inversion is, however, unnecessary.

Referring now to FIG. 6, a detailed circuit diagram for the embodiment of FIG. 1 operated in the alternate mode to indicate state as well as change of the inputs, is shown. The switching device 18 has been omitted. The summing circuit 10, the converter circuit 12 and the output gating circuit 14 are generally enclosed by broken lines.

The input terminals 16 may each be connected via a weighting or scaling register 32 to the inverting input terminal of a summing amplifier 34. The weighting resistors 32 serve to properly scale the input signals to be identical when applied to the amplifier 34.

The summing amplifier 34 is connected to operate in a conventional manner by having the non-inverting input thereof connected to be maintained at ground potential. A feedback path including a resistor 36 and a diode 38 is provided between the output terminal and the inverting input terminal of the amplifier 34. The resistor 36 serves to have the amplifier 34 provide linear operation for negative output signals. The application of any positive signal to the inverting input terminal will result in the amplifier 34 providing a negative output signal. The amplifier 34 is connected to provide a maximum positive output signal in response to any net negative input by having the diode 38 open the feedback path for any positive output. A capacitor 40 is connected in parallel with the feedback resistor 36 and the diode 38 to form an AC feedback path which eliminates noisy operation.

The converter circuit 12 includes an amplifier 42 which receives at an inverting input terminal thereof the sum signal from the summing amplifier 34 via a diode 44 and a timing circuit 46. The diode 44 is biased to only transmit negative signals relative to the voltage applied to the anode thereof. The timing circuit 46 includes a pair of resistors 48 and 50 and a capacitor 52 the values of which may be adjusted to control the width of output pulses provided by the amplifier 42 in response to the negative sum signals from the summing amplifier 34.

The non-inverting input terminal of the amplifier 42 is connected to receive a negative bias voltage from an appropriate source. A pair of resistors 54 and 56 may be used to form a voltage divider to permit adjustment of the bias voltage applied to the non-inverting input terminal of the amplifier 42. The bias voltage is selected to have the amplifier 42 provide a slightly negative output signal whenever no negative signal is applied to the inverting input terminal thereof. A coupling resistor 58 and a diode 60 are connected in series with the output of the amplifier 42. The diode 60 serves to block the ambient negative output signals from the amplifier 42 and permit only positive pulses to be transmitted therethrough.

The output signals of the converter amplifier 42 are applied to render a gating transistor 62 conductive for the duration of pulses from the converter circuit 12. Output signals appearing across the output terminals 64 and 66 will be zero when the transistor 62 is conductive since both terminals will be at ground potential. When the transistor 62 is non-conductive, however, the terminal 64 will be maintained at some positive voltage determined by the bias voltage applied via a bias resistor 68.

The transistor 62 is maintained non-conductive by negative signals provided from the summing circuit 10 to the base of the transistor 62 via the alternate path provided by a lead 69. It is noted that when all monitored signals are at a normal low level, the amplifier 34 supplies a positive voltage to the transistor 62 and thereby maintains the transistor 62 conductive. A resistor 70 is connected in the alternate path as a current limiter. A diode 72 is connected between the resistor 70 and ground potential to limit the negative current that can be applied to the transistor 62. a resistor 74 serves to isolate the diode 72 from the diode 60.

The operation of the circuit of FIG. 6 is reviewed with reference to FIG. 7. The waveform 7A illustrates a representative cumulative input signal appearing at the terminals 16 for application to the amplifier 34. Waveform 7B illustrates the resulting output signals that would be provided by the amplifier 34 wherein the output becomes increasingly more negative in discrete steps in response to each discrete increase in the number of abnormal monitored signals applied thereof. Conversely, the output of the amplifier 34 becomes more positive as the number of abnormal high level signals is decreased. As shown, the output of the amplifier 34 is positive when all monitored signals at the terminals 16 are at a normal low level.

Negative signals applied from the output of the amplifier 34 to the inverting input terminal of the amplifier 42, via the timing circuit and the capacitor 52 thereof, cause positive output pulses (as illustrated by waveform 7C) to be provided by the amplifier 42 whenever the signals from the amplifier 34 are changed to become more negative. The width of the pulses shown in waveform 7C are, as earlier mentioned, controlled by the selection of the elemental values of the timing circuit 46.

The transistor $Q_1$ is biased into conduction by each of the positive pulses provided thereto from the converter circuit 12. As shown by waveform 7D, the transistor 62 receives a positive signal at the base thereof whenever all monitored signals are normal and whenever there is an increase in the number of abnormal monitored signals. Waveform 7E illustrates the output signals provided at the output terminals 64 and 66 as a result of a signal illustrated by waveform 7D being applied to the transistor 62.

The converter circuit illustrated by FIG. 6 may be readily modified to sense decreases or down-going changes. For example, the diode 44 would be reversed to have the anode thereof connected to the output of the amplifier 34, and output signals from the amplifier 34 would be applied via the diode 44 to the non-inverting input terminal of the amplifier 42 instead of the inverting terminal thereof. A positive bias voltage would be applied to the inverting terminal of the amplifier 42. With these modifications only output signals from the summing amplifier 34 that are changed to become more positive in response to decreases in the number of abnormal monitored signals would be applied to the amplifier 42.

The positive-going pulses illustrated by FIG. 5-3*a*, waveforms d, may be provided by appropriately adjusting the output voltage level of the amplifier 42 and the biasing voltages applied to the output gating transistor 62. For example, the transistor 62 may be maintained normally conductive and be rendered non-conductive by the positive pulses from the amplifier 42.

From the foregoing discussion it is now clear that the subject invention provides circuitry that will provide unique output pulses in response to the change in state of any one of several bistate signals being monitored wherein the output pulses may be readily applied to control some utilization device such as an audible or visible warning device. It is also now clear that the subject invention provides a simple analog circuit that would be inexpensive to produce, and which is significantly less complex than other prior art systems that have been used to accomplish the same function thereof.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the nvention may be made.

What is claimed is:

1. A circuit for simultaneously monitoring a plurality of bilevel signals each having an ambient level and an abnormal level, said circuit providing an output signal indicative of selected changes in the number of monitored signals at an abnormal level, said circuit comprising:

summing means, connected to concurrently receive said monitored signals, for providing a sum signal having an amplitude that is representative of the cumulative levels of said monitored signals;

converter means, responsive to selected changes in the amplitude of said sum signal, for providing an enabling pulse in response to each of said selected changes; and output means, responsive to said enabling pulses, for providing an output signal including an output pulse for each of said selected changes in the number of monitored signals at said abnormal level.

2. The circuit defined by claim 1, said summing means including:

a summing amplifier for providing said sum signals in response to signals applied as inputs thereto;

a plurality of input leads for applying each of the signals to be monitored to said summing amplifier; and weighting means connected in said input leads for scaling the monitored signals to uniformly each have said ambient level and said abnormal level.

3. The circuit defined by claim 1, said converter means including:

selector means for selectively transmitting portions of said sum signal corresponding to either increases or decreases in the amplitude thereof;

timing means, responsive to the transmitted portions of said sum signal for providing a pulsed signal having a selected width; and means for shaping said pulsed signal to provide said enabling pulses.

4. The circuit defined by claim 3, said circuit including first and second converter means, said first converter means having selector means for transmitting portions of said sum signal corresponding to increases in the amplitude thereof, and said second converter means having selector means for transmitting portions of said sum signal corresponding to decreases in the amplitude thereof.

5. The circuit defined by claim 1, said output means including:

a semi-conductor device connected to have the conductive state thereof changed from one state to an alternate state in response to and for the duration of said enabling pulses; and means connected to said semi-conductor device for providing said output signals in response to operation of said semi-conductor device.

6. The circuit defined by claim 1 further including means connected between the output of said summing means and said output means for controlling said output means to provide output signals having a first amplitude when all monitored signals are at an ambient level and output signals having a second amplitude when any monitored signal is at said abnormal level.

7. The circuit defined by claim 3, said summing means including:

a summing amplifier for providing said sum signals in response to signals applied as inputs thereto;

a plurality of input leads for applying each of the signals to be monitored to said summing amplifier; and weighting means connected in said input leads for scaling the monitored signals to uniformly each have said ambient level and said abnormal level.

8. The circuit defined by claim 7, said output means including:

a semi-conductor device connected to have the conductive state thereof changed from one state to an alternate state in response to and for the duration of said enabling pulses; and means connected to said semi-conductor device for providing said output signals in response to operation of said semi-conductor device.

9. The circuit defined by claim 8 further including means connected between the output of said summing means and said output means for controlling said output means to provide output signals having a first amplitude when all monitored signals are at an ambient level and output signals having a second amplitude when any monitored signal is at said abnormal level.

10. The circuit defined by claim 9, said circuit including first and second converter means, said first converter means having selector means for transmitting portions of said sum signal corresponding to increases in the amplitude thereof, and said second converter means having selector means for transmitting portions of said sum signal corresponding to decreases in the amplitude thereof.

11. The circuit defined by claim 10 including first and second output means each connected to be responsive to the enabling pulses of a different one of said first and second converter means, said first output means providing output signals for each increase in the number of monitored signals at an abnormal level, and said second output means providing output signals for each decrease in the number of monitored signals at an abnormal level.

* * * * *